United States Patent Office 3,205,262
Patented Sept. 7, 1965

3,205,262
PRODUCTION OF N,N'-DISUBSTITUTED FORMAMIDINES
Matthias Seefelder and Wolfgang Jentzsch, Ludwigshafen (Rhine), Germany, assignors to Badische Anilin- & Soda-Fabrik Aktiengesellschaft, Ludwigshafen (Rhine), Germany
No Drawing. Filed Jan. 11, 1963, Ser. No. 250,780
Claims priority, application Germany, Jan. 18, 1962, B 65,553
5 Claims. (Cl. 260—564)

This invention relates to a process for the production of formamidines in which one hydrogen atom of each of the two nitrogen atoms is replaced by an aliphatic or araliphatic substituent.

Some methods are already known for the production of symmetrical N,N'-disubstituted formamidines. Thus N,N'-diarylsubstituted formamidines have been obtained from orthoformic esters and primary aromatic amines. It is also known to prepare N,N'-diarylsubstituted amidines by reacting sodium formate with primary arylamines. Furthermore it has been possible to alkylate N-monosubstituted amidines at the second nitrogen atom. It is also known that symmetrical N,N'-disubstituted foramidines are obtained from formimino ethers by the action of primary amines. All these methods have the disadvantage that either the initial material is not easily accessible or is unstable, or the yield is relatively small. In some cases it is possible only to prepare arylsubstituted formamidines in the manner described, but not N,N-dialkylsubstituted formamidines.

It is also known that N,N'-disubstituted amidines can be prepared from N-monosubstituted carboxylic amides and amines by means of phosphorus oxychloride or phosphorus pentachloride. It is possible to use this reaction only for the production of N,N'-diarylated amidines and it is not suitable for the production of dialiphatic or aliphatic-aromatic N,N'-disubstituted amidines. The same reaction, but without the coemployment of halogenating agents can only be carried out in a few exceptional cases which always lead to N,N'-diarylated amidines.

According to another method, N,N'-disubstituted formamidines are obtained from s-triazine by reaction with primary aliphatic or aromatic amines.

It is an object of this invention to provide a process for the production of N,N'-disubstituted formamidines which have an aliphatic substituent on both nitrogen atoms. It is another object of the invention to provide a process for the production of N,N'-disubstituted formamidines in a one-step process from readily accessible initial materials. It is further an object of the invention to provide a process for the production of N,N'-disubstituted formamidines in high yields.

We have now found in accordance with this invention that symmetrically substituted N,N'-disubstituted formamidines having the general formula

R—NH—CH=N—R in which R represents an alkyl or aralkyl radical which in turn may contain inert groups, such as dialkylamino, ether or hydroxy groups, are obtained in a very simple way by mixing an amine of the general formula R—NH$_2$ in which R has the above meaning with hydrogen cyanide in a molar ratio of at least 2:1 and leaving the mixture at a temperature between 50° and 135° C., preferably between 80° and 120° C., until liberation of ammonia has substantially ended, and then distilling off the reaction product obtained.

Although it is known that hydrogen cyanide will add on to primary amines, it has not hitherto been possible to obtain the monosubstituted formamidines thus formed in a pure form (cf. Houben-Weyl, "Methoden der organischen Chemie," volume XI/2, Stuttgart, 1958, page 40). The course of the reaction according to this invention is surprising because on heating unsymmetrical N,N-disubstituted amidines, liberation of ammonia takes place with the union of two molecules.

The reaction may be illustrated as follows for example with reference to the reaction of n-butylamine with hydrogen cyanide:

$2C_4H_9NH_2 + HCN \rightarrow C_4H_9—NH—CH=N—C_4H_9 + NH_3$

Hydrogen cyanide may be supplied in gaseous phase or, provided the mixing of the reactants takes place at low temperature, in liquid phase. Hydrogen cyanide diluted with an inert gas, for example nitrogen or argon, may also be used.

Suitable primary amines are aliphatic and araliphatic amines, for example alkylamines having one to twelve carbon atoms, particularly lower alkylamines having one to six carbon atoms, for example methylamine, ethylamine, propylamine, the various butylamines, n-octylamine, 2-ethylhexylamine or dodecylamine. Of the araliphatic amines containing seven to twelve carbon atoms, β-phenylethylamine is particularly suitable. The amines may contain one or two inert groups, for example dialkylamino groups, containing one to four carbon atoms in the alkyl radical, alkoxy groups containing one to four carbon atoms in the alkoxy radical, nitrile radicals or hydroxy radicals. Examples of such compounds are β-dimethylaminopropylamine, β-ethoxyethylamine, p-methoxybenzylamine, ω-cyano-n-pentylamine, ethanolamine or propanolamine.

The process may be carried out in the presence or absence of inert solvents. Suitable solvents are open or cyclic saturated ethers, particularly those having a molecular weight of up to 180, for example diethyl ether, tetrahydrofuran, dioxane and di-n-butyl ether, and also aliphatic, cycloaliphatic or aromatic hydrocarbons, particularly those having a molecular weight of up to 180, for example, petroleum ether, heptane, octane, cyclohexane, benzene, toluene, the xylenes or decahydronaphthalene. Inert chlorinated hydrocarbons may also be used, such as chlorobenzene or carbon tetrachloride.

For economic reasons, it is not recommendable to use too high a ratio of solvent to reactants, for example, a ratio higher than 1:10.

Hydrogen cyanide and amine are mixed in about the ratio 1:2 or with a stoichiometric excess of amine. It is not necessary to use, or at least there is no advantage in using, more than 5 moles of amine for each mole of hydrogen cyanide.

The reactants are first mixed, for example at room temperature or a higher temperature but not above 130° C. When mixing is effected at room temperature, the mixture may be allowed to stand for some time. Then the mixture is kept at a temperature between 50° and 135° C. until the liberation of ammonia is practically ended. At temperatures below 50° C., for example at 40° C., no N,N'-disubstituted formamidines are formed.

The process may be carried out in various ways; for example a reflux condenser may be fitted to the reactor so that all the components except ammonia are retained. It is then easy to determine, for example, by means of a bubble counter, whether gas is still escaping. When the reaction is carried out at a pressure above atmospheric, for example in an autoclave, the reaction mixture is allowed to remain at a temperature within the stated limits until there is no further increase in the pressure.

When working continuously, provision should be made for the residence period in the said temperature range to be sufficiently long to cause liberation of ammonia. In accordance with the known principles, the reaction rate increases as the temperature increases, but 50° C. should be regarded as the lower limit. A temperature range between 80° and 120° C. is preferred. To avoid secondary reactions, a temperature of 135° C. should not be exceeded.

The process may be carried out in the gas phase or in the liquid phase provided the reactants can be vaporized or liquefied within the said temperature range. The process may however also be carried out under increased pressure, for example, at 1 to 5 atmospheres gauge, or at still higher pressures, for example up to 50 atmospheres gauge, and it is possible to use a pressure which is higher than the vapor pressure of the reactants, including any solvent, at the temperature in question, for example by forcing in an inert gas.

After the reaction, the reaction mixture is worked up by distillation, preferably under reduced pressure.

The invention is further illustrated by the following examples in which, unless otherwise stated, parts are by weight. Parts by weight and parts by volume are in the same relation as the gram and the cubic centimeter.

*Example 1*

240 parts of liquid hydrogen cyanide is allowed to flow while cooling into 775 parts of liquid methylamine. The mixture is then heated to 80° C. in a pressure vessel and kept at this temperature for twenty hours. A pressure of about 30 atmospheres gauge is thereby set up. The crude mixture is distilled and 428 parts of N,N'-dimethylformamidine having a boiling point of 50° to 53° C. at 12 mm. Hg is obtained; this is 68% of the theory with reference to hydrogen cyanide.

*Example 2*

80 parts of liquid hydrogen cyanide is allowed to flow while cooling into 400 parts of n-propylamine and the mixture is then heated to boiling beneath a reflux condenser cooled to −10° C., the bottoms temperature thus slowly rising from about 50° to 65° C. After escape of ammonia has ended, the reaction mixture is distilled under reduced pressure. 181 parts of N,N'-di-n-propylformamidine having the boiling point 94° to 96° C. at 20 mm. Hg is obtained, i.e., 60% of the theory with reference to hydrogen cyanide.

*Example 3*

77 parts of liquid hydrogen cyanide is allowed to flow at room temperature into 500 parts of n-butylamine. After standing for three hours, the mixture is heated until it refluxes, the bottoms temperature being initially about 60° C. and at the end of the reaction about 80° C. When ammonia no longer escapes, the reaction mixture is heated for another thirty minutes at 95° C. and then distilled. 270 parts of N,N'-di-n-butylformamidine having the boiling point 115° to 125° C. at 20 mm. Hg is obtained, i.e., 60% of the theory with reference to hydrogen cyanide.

For purposes of comparison, 500 parts of n-butylamine is mixed at room temperature with 77 parts of hydrogen cyanide. After standing for three hours, the mixture is heated slowly to 40° to 42° C. and kept at this temperature for ten hours. The product is then distilled, the pressure being adjusted so that the bottoms temperature does not exceed 50° C. 485 parts of n-butylamine is recovered. When the residual syrup is subjected to high vacuum distillation, 40 parts of a heterogeneous product boiling between 80° and 98° C. at 0.5 mm. Hg is obtained.

*Example 4*

900 parts of isobutylamine is heated until vigorous refluxing takes place, a column filled with Raschig rings being interposed between the still and the reflux condenser. Then 136 parts of hydrogen cyanide in gas phase (with a little nitrogen as a carrier gas) is passed in within three hours at a short distance below the column. The reaction temperature is regulated at 68° C. by the boiling isobutylamine. The reaction mixture condenses and flows into the vessel with the boiling isobutylamine. By distilling the product, 441 parts of N,N'-diisobutylformamidine having the boiling point 97° to 113° C. at 13 mm. Hg is obtained, i.e., 56% of the theory with reference to hydrogen cyanide.

*Example 5*

41 parts of hydrogen cyanide is added to 396 parts of 3-dimethylaminopropylamine at room temperature. The mixture is then heated slowly until ammonia escapes (about 70° C.). After five hours, the temperature is raised for a short time to 90° C. and the product then distilled. In addition to 220 parts of 3-dimethylaminopropylamine recovered, 93 parts of N,N'-bis-(3-dimethylaminopropyl)-formamidine having the boiling point 100° to 120° C. at 1 mm. Hg is obtained, i.e., 50% of the theory with reference to reacted 3-dimethylaminopropylamine.

*Example 6*

A solution of 440 parts of β-phenylethylamine in tetrahydrofuran is mixed at room temperature with 40 parts of hydrogen cyanide and allowed to stand for twelve hours. The mixture is then heated in a pressure vessel for fifteen hours at 60° C. and then for five hours at 90° to 95° C. The reaction mixture is distilled and, in addition to recovering 201 parts of initial material, 160 parts of N,N'-bis-(β-phenylethyl)-formamidine having the boiling point 180° to 195° C. at 0.5 mm. Hg is obtained, i.e., 64% of the theory with reference to reacted β-phenylethylamine.

*Example 7*

100 parts of 3,5,5-trimethyl-n-hexylamine, 6 parts of hydrogen cyanide and 250 parts of toluene are mixed and then heated in a pressure vessel for 20 hours at 140° C., a gauge pressure of 11 atmospheres being set up. By distillation of the reaction product, 44 parts of N,N'-bis-[3,3,5-trimethyl-n-hexyl]-formamidine of the boiling point 135° to 141° C. at 0.3 mm. Hg is obtained in addition to 32.5 parts of unreacted 3,5,5-trimethyl-n-hexylamine. This is a yield of 64% of the theory based on 3,5,5-trimethyl-n-hexylamine reacted.

*Example 8*

168 parts of ω-cyano-n-pentylamine, 14 parts of hydrogen cyanide and 200 parts of toluene are mixed and then heated in a pressure vessel for 20 hours at 125° C., a gauge pressure of 9.5 atmospheres being set up. By distillation of the reaction mixture, 63 parts of unreacted ω-cyano-n-pentylamine and 73 parts of N,N'-bis-[ω-cyano-n-pentyl]-formamidine of the boiling point 152° to 158° C. at 0.2 mm. Hg are obtained. This is a yield of 66% of the theory based on ω-cyano-n-pentylamine.

*Example 9*

178 parts of 3-methoxy-n-propylamine, 16 parts of hydrogen cyanide and 700 parts of dry dioxane are mixed and then heated in a pressure vessel for 40 hours at 125° C., a gauge pressure of 10 atmospheres being set up. By fractionation of the reaction product, 52 parts of 3-methoxypropylamine and 78 parts of N,N'-bis-[3-methoxy-n-propyl]-formamidine of the boiling point 88° C. at 0.8 mm. Hg is obtained. This is a yield of 59% of the theory based on 3-methoxypropylamine reacted.

We claim:

1. A process for the production of symmetrically substituted N,N'-disubstituted formamidines of the formula R—NH—CH=N—R in which R represents a radical selected from the group consisting of alkyl with 1 to 12 carbon atoms, phenyl alkyl with 7 to 12 carbon atoms, and alkyl with 1 to 12 carbon atoms and substituted with from 1 to 2 inert substituents selected from the group consisting of dialkylamino, alkoxy and cyano groups, which comprises mixing an amine of the formula R—NH$_2$ in which R has the above meaning with hydrogen cyanide in a molar ratio of at least 2:1, maintaining the mixture at a temperature of from 50° to 135° C. until liberation of ammonia is substantially ended, and thereafter distilling the reaction mixture.

2. A process for the production of symmetrically substituted N,N'-disubstituted formamidines of the formula R—NH—CH=N—R in which R represents a radical selected from the group consisting of alkyl with 1 to 12 carbon atoms, phenylalkyl with 7 to 12 carbon atoms, and alkyl with 1 to 12 carbon atoms and substituted with 1 to 2 inert substituents selected from the group consisting of dialkylamino, alkoxy and cyano groups, which comprises mixing an amine of the formula R—NH$_2$ in which R has the above meaning with hydrogen cyanide in a molar ratio of at least 2:1 and in the presence of an inert solvent, maintaining the mixture at a temperature of from 50° to 135° C. until liberation of ammonia is substantially ended, and thereafter distilling the reaction mixture.

3. A process as claimed in claim 1 in which the mixture is kept at a temperature of from 80° to 120° C.

4. A process for the production of symmetrically substituted N,N'-disubstituted formamidines of the formula R—NH—CH=N—R in which R represents an alkyl with 1 to 12 carbon atoms, which comprises mixing a primary alkylamine with 1 to 12 carbon atoms with hydrogen cyanide in a molar ratio of at least 2:1, maintaining the mixture at a temperature of from 50° to 135° C. until liberation of ammonia is substantially needed, and thereafter distilling the reaction mixture.

5. A process for the production of N,N'-dimethylformamidine which comprises mixing methylamine with hydrogen cyanide in a molar ratio of at least 2:1, maintaining the mixture at a temperature of from 50° to 135° C. and at a pressure up to 50 atmospheres until liberation of ammonia is substantially ended, and thereafter distilling the reaction mixture.

References Cited by the Examiner
UNITED STATES PATENTS 2,615,023  10/52  Erickson _____ 260—564 X CHARLES B. PARKER, *Primary Examiner.*